(12) United States Patent
Vedula et al.

(10) Patent No.: US 7,357,889 B2
(45) Date of Patent: Apr. 15, 2008

(54) MELT SPUN TPU FIBERS AND PROCESS

(75) Inventors: Ravi R. Vedula, North Ridgeville, OH (US); Yinbing Xia, Beijing (CN)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 245 days.

(21) Appl. No.: 10/813,218

(22) Filed: Mar. 30, 2004

(65) Prior Publication Data

US 2004/0230012 A1    Nov. 18, 2004

Related U.S. Application Data

(60) Provisional application No. 60/461,473, filed on Apr. 9, 2003.

(51) Int. Cl.
*D01D 5/08* (2006.01)
*C08G 18/28* (2006.01)

(52) U.S. Cl. ............... 264/172.17; 525/453; 525/454; 525/457; 525/458; 525/460; 528/65; 528/84; 528/85; 442/359

(58) Field of Classification Search .................... None
See application file for complete search history.

(56) References Cited

U.S. PATENT DOCUMENTS

| | | | |
|---|---|---|---|
| 3,016,364 A | 1/1962 | Miller et al. | |
| 3,494,894 A | 2/1970 | Urgesi | |
| 3,503,933 A | 3/1970 | Kaizerman et al. | |
| 4,120,850 A | 10/1978 | Pechhold | |
| 4,131,731 A | 12/1978 | Lai et al. | |
| 4,202,957 A | 5/1980 | Bonk | |
| 4,447,590 A | 5/1984 | Szycher | |
| 4,877,856 A | 10/1989 | Hall et al. | |
| 5,545,706 A | 8/1996 | Barksby et al. | |
| 5,840,233 A | 11/1998 | Foss | |
| 5,959,059 A | 9/1999 | Vedula et al. | |
| 6,127,506 A | 10/2000 | Greene | |

FOREIGN PATENT DOCUMENTS

| | | |
|---|---|---|
| EP | 0 343 985 B1 | 11/1989 |
| EP | 0 548 364 A1 | 6/1993 |
| EP | 0 972 864 A1 | 1/2000 |
| JP | 57-112409 | 7/1982 |
| JP | 57-112409 A * | 7/1982 |
| JP | 58098421 A2 | 6/1983 |
| JP | 58186609 A2 | 10/1983 |
| JP | 60048617 A2 | 3/1985 |
| JP | 1-167389 A * | 7/1989 |
| JP | 1282387 A2 | 11/1989 |
| WO | WO 98/56845 A1 | 12/1998 |
| WO | WO 02/068534 A1 | 9/2002 |

OTHER PUBLICATIONS

Translation of JP 1-167389 into English.*
BFGoodrich Company, Product Data Sheet, ESTANE 58280 TPU Polyether Based Polyurethane (Estane Thermoplastic Polyurethanes), Jul. 2000.
Saunders & Frisch, "Polyurethanes Chemistry And Technology", Part I, Chemistry, 1962, pp. 284-285 and pp. 294.

* cited by examiner

*Primary Examiner*—Marc S. Zimmer
(74) *Attorney, Agent, or Firm*—Joe A. Powell; Samuel B. Laferty; Thoburn T. Dunlap

(57) ABSTRACT

Thermoplastic polyether polyurethane polymers are disclosed which are mixed with a non-polyether crosslinking agent to achieve long run times in a melt spinning process to make elastic fibers. The crosslinking agent is preferably a polyester polyol reacted with a diisocyanate. A melt spinning process is also disclosed using a polyether polyurethane with a polyester crosslinking agent. Long melt spinning run times can be achieved without experiencing excessive pressure buildup in the spinneret and fiber breakage.

33 Claims, 1 Drawing Sheet

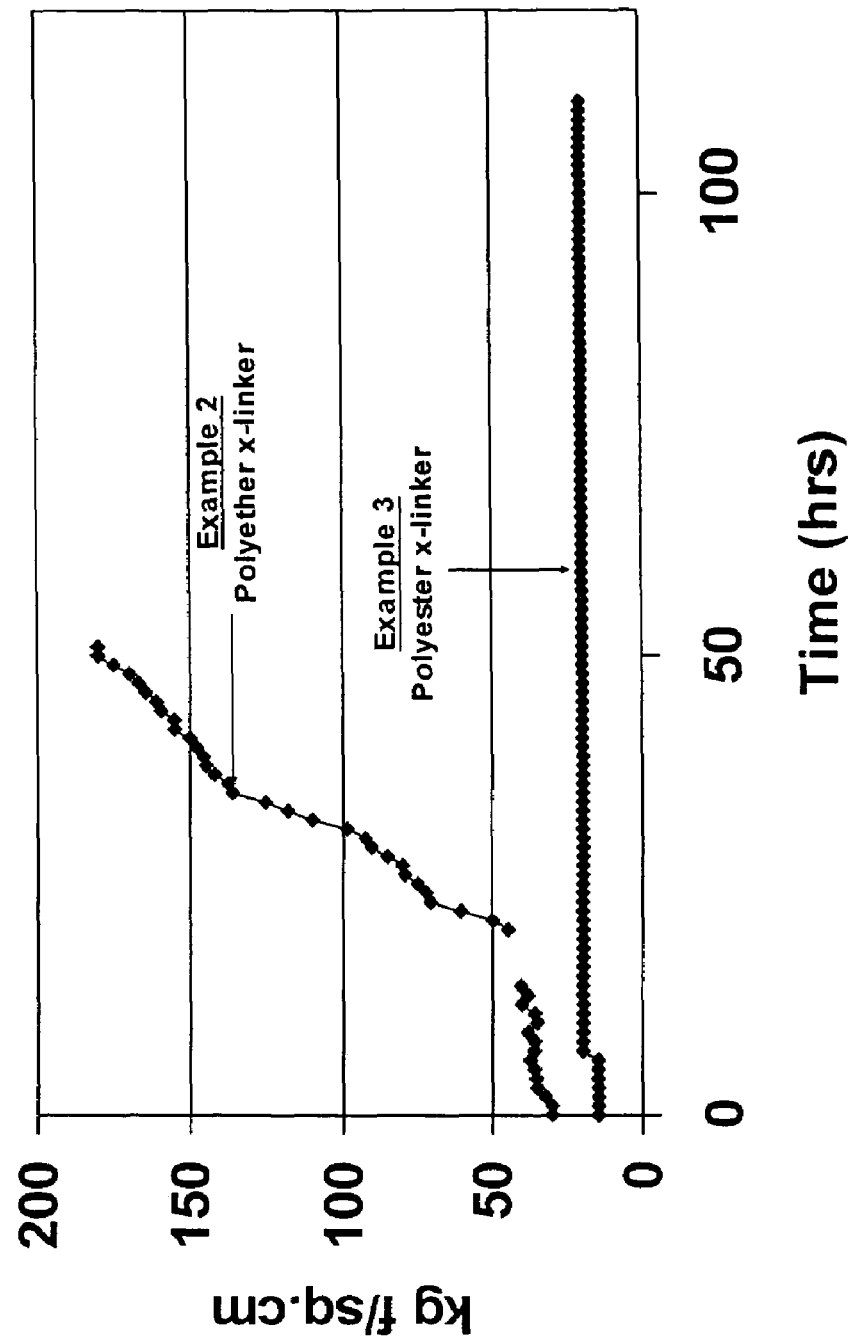

MELT SPUN TPU FIBERS AND PROCESS

CROSS REFERENCE TO RELATED APPLICATION

This patent application claims priority from U.S. Provisional Application Serial No. 60/461,473 filed on Apr. 9, 2003.

FIELD OF THE INVENTION

The present invention relates to thermoplastic polyurethane (TPU) compositions for making melt spun elastic fibers, such as spandex. The invention also relates to process to produce melt spun TPU fibers where the run time is greatly increased before experiencing fiber breakage.

BACKGROUND OF THE INVENTION

The vast majority of TPU fibers are made by a dry spinning process involving dissolving the TPU in solvent. The melt spinning process to produce TPU fibers has several inherent advantages including less cost, less capital cost, and less environmental concerns as a result of not using volatile solvents.

TPU compositions for making melt spun fibers contain a TPU polymer made from a hydroxyl terminated intermediate which is typically a polyether or polyester end capped with a hydroxyl group; a polyisocyanate, such as a diisocyanate; and a hydroxyl terminated chain extender. The hydroxyl terminated intermediate forms the soft segment of the TPU polymer while the polyisocyanate and the chain extender forms the hard segment of the TPU polymer. The combination of soft and hard segments give the TPU polymer elastic properties. The TPU polymer is also frequently lightly cross linked by using a pre-polymer end capped with a polyisocyanate. The cross linking material is added to the melted TPU polymer during spinning.

Polyester and polyether based TPU have both been used in melt spinning TPU fibers. Polyether based TPU fibers can be made to have higher heat resistance and have better hydrolytic stability than TPU fibers made from polyester based TPU.

Polyether TPU fibers have better properties if the polyether hydroxyl terminated intermediate used to make the TPU is higher in molecular weight. Unfortunately, polyether TPU's using a higher molecular weight hydroxyl terminated intermediate tend to have a shorter run time before experiencing pressure build up in the spinneret, thus leading to fiber breakage. When fibers break in a spinning operation, the production line must be shut down and the spinneret cleaned. This is a costly down time and production is lost.

It would be desirable to be able to use TPU polymers which are made from a polyether intermediate having higher molecular weight while retaining the long run time of TPU made with a low molecular weight polyether intermediate.

BRIEF DESCRIPTION OF THE DRAWINGS

FIG. 1 is a graph showing spin pack pressure vs. time during melt spinning fibers from a TPU polymer with crosslinking agent added. The same TPU polymer is used and one run is crosslinked with a polyether crosslinking agent (comparative) and the other run is crosslinked with a polyester crosslinking agent (this invention). The y axis of the graph shows pressure buildup in Kg. force per square cm., while the x axis of the graph shows melt spin running time in hours.

SUMMARY OF THE INVENTION

It is an object of the present invention to be able to use a thermoplastic (TPU) made from a higher molecular weight polyether hydroxyl terminated intermediate for melt spinning TPU fibers while achieving long run times before experiencing fiber breakage.

The TPU polymer comprises the reaction of: (a) at least one hydroxyl terminated polyether intermediate having a number average molecular weight of at least 1200 Daltons, preferably from 1500 to 4000 Daltons, and more preferably 1800 to 2500 Daltons; (b) at least one polyisocyanate, preferably a diisocyanate; and (c) at least one hydroxyl terminated chain extender.

The TPU polymer is lightly crosslinked by adding at least one crosslinking agent made from (a) a hydroxyl terminated polyol selected from the group consisting of polyester, polycaprolactone, and polycarbonate and (b) a polyisocyanate. Preferably, the polyol is a polyester polyol and the polyisocyanate is a diisocyanate. The crosslinking agent has an isocyanate functionality greater than 1.0 and preferably from about 1.5 to 2.5 and more preferably an isocyanate functionality of about 1.8 to 2.2.

Melt spun TPU fibers are made by melting the TPU polymer in an extruder and adding the crosslinking agent to the melted TPU. The TPU polymer melt with crosslinking agent is fed to a spinneret. The melt exits the spinneret in the form of fibers. The fibers are cooled and wound onto bobbins.

The process using a polyether TPU together with a non-polyether crosslinker exhibits much less pressure buildup in the spinneret thus allowing the melt spun fibers to be made in a continuous process for extended periods of time without fiber breakage.

DETAILED DESCRIPTION OF THE INVENTION

In the prior art method of adding a crosslinking agent to a TPU polymer to make melt spun TPU fibers, it is customary to use an isocyanate terminated polyether pre-polymer if the TPU polymer is a polyether TPU. Likewise, if a polyester TPU polymer is used, it is customary to use an isocyanate terminated polyester pre-polymer for the crosslinking agent.

Applicants have unexpectedly found that when using a polyether TPU, a non-polyether crosslinking agent gives superior processing features for melt spinning fibers. It has been found that the segmented polyether TPU polymer when combined with a non-polyether crosslinking agent allows the polyether TPU to be melt spun for extended periods of time without excessive pressure building up in the spin pack of the spinneret. Excessive pressure results in fiber breakage, thus requiring the melt spinning operation to be halted until the spin pack can be cleaned.

To produce the melt-spun fibers according to this invention, it is required to have a polyether TPU and a non-polyether crosslinking agent.

The polyether TPU used can be made by reacting a polyether hydroxyl terminated intermediate with a polyisocyanate and a chain extender.

Hydroxyl terminated polyether intermediates are polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethyl glycol) comprising water reacted with tetrahydrofuran (PTMG). Polytetramethylene ether glycol (PTMEG) is the preferred polyether intermediate. Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a number average molecular weight (Mn), as determined by assay of the terminal functional groups which is an average molecular weight greater than 1200, such as from about 1200 to about 10,000, desirably from about 1500 to about 5,000, and preferably from about 1800 to about 2500 Daltons.

The second necessary ingredient to make the TPU polymer of this invention is a polyisocyanate.

The polyisocyanates of the present invention generally have the formula $R(NCO)_n$ where n is generally from 2 to 4 with 2 being highly preferred inasmuch as the composition is a thermoplastic. Thus, polyisocyanates having a functionality of 3 or 4 are utilized in very small amounts, for example less than 5% and desirably less than 2% by weight based upon the total weight of all polyisocyanates, inasmuch as they cause crosslinking. R can be aromatic, cycloaliphatic, and aliphatic, or combinations thereof generally having a total of from 2 to about 20 carbon atoms. Examples of suitable aromatic diisocyanates include diphenyl methane-4,4'-diisocyanate (MDI), $H_{12}$ MDI, m-xylylene diisocyanate (XDI), m-tetramethyl xylylene diisocyanate (TMXDI), phenylene-1,4-diisocyanate (PPDI), 1,5-naphthalene diisocyanate (NDI), and diphenylmethane-3,3'-dimethoxy-4,4'-diisocyanate (TODI). Examples of suitable aliphatic diisocyanates include isophorone diisocyanate (IPDI), 1,4-cyclohexyl diisocyanate (CHDI), hexamethylene diisocyanate (HDI), 1,6-diisocyanato-2,2,4,4-tetramethyl hexane (TMDI), 1,10-decane diisocyanate, and trans-dicyclohexylmethane diisocyanate (HMDI). A highly preferred diisocyanate is MDI containing less than about 3% by weight of ortho-para (2,4) isomer.

The third necessary ingredient to make the TPU polymer of this invention is the chain extender. Suitable chain extenders are lower aliphatic or short chain glycols having from about 2 to about 10 carbon atoms and include for instance ethylene glycol, diethylene glycol, propylene glycol, dipropylene glycol, 1,4-butanediol, 1,6-hexanediol, 1,3-butanediol, and 1,5-pentanediol. Aromatic glycols can also be used as the chain extender. Benzene glycol and xylenene glycols are suitable chain extenders for use in making the TPU of this invention. Xylenene glycol is a mixture of 1,4-di(hydroxymethyl)benzene and 1,2-di(hydroxymethyl) benzene. Benzene glycol is the preferred aromatic chain extender and specifically includes hydroquinone, i.e., bis(beta-hydroxyethyl)ether also known as 1,4-di(2-hydroxyethoxy) benzene; resorcinol, i.e., bis(beta-hydroxyethyl) ether also known as 1,3-di(2-hydroxyethyl) benzene; catechol, i.e., bis(beta-hydroxyethyl) ether also known as 1,2-di(2-hydroxyethoxy) benzene; and combinations thereof. A blend of two or more glycol chain extenders may be used. The most preferred chain extender is 1,4-butanediol.

The above three necessary ingredients (polyether intermediate, polyisocyanate, and chain extender) are preferably reacted in the presence of a catalyst.

Generally, any conventional catalyst can be utilized to react the diisocyanate with the polyether intermediate or the chain extender and the same is well known to the art and to the literature. Examples of suitable catalysts include the various alkyl ethers or alkyl thiol ethers of bismuth or tin wherein the alkyl portion has from 1 to about 20 carbon atoms with specific examples including bismuth octoate, bismuth laurate, and the like. Preferred catalysts include the various tin catalysts such as stannous octoate, dibutyltin dioctoate, dibutyltin dilaurate, and the like. The amount of such catalyst is generally small such as from about 20 to about 200 parts per million based upon the total weight of the polyurethane forming monomers.

The polyether TPU polymers of this invention can be made by any of the conventional polymerization methods well known in the art and literature.

Thermoplastic polyurethanes of the present invention are preferably made via a "one shot" process wherein all the components are added together simultaneously or substantially simultaneously to a heated extruder and reacted to form the polyurethane. The equivalent ratio of the diisocyanate to the total equivalents of the hydroxyl terminated polyether intermediate and the diol chain extender is generally from about 0.95 to about 1.10, desirably from about 0.98 to about 1.05, and preferably from about 0.99 to about 1.03. The equivalent ratio of the hydroxyl terminated polyether to the hydroxyl terminated chain extender is generally from 0.5 to about 1.5 and preferably from about 0.70 to about 1. Reaction temperatures utilizing urethane catalyst are generally from about 175° C. to about 245° C. and preferably from about 180° C. to about 220° C. The molecular weight (Mw) of the thermoplastic polyurethane is generally from about 150,000 to about 800,000 and desirably from about 200,000 to about 400,000 and preferably about 250,000 to about 350,000 as measured by GPC relative to polystyrene standards.

The thermoplastic polyurethanes can also be prepared utilizing a pre-polymer process. In the pre-polymer route, the hydroxyl terminated polyether intermediate is reacted with generally an equivalent excess of one or more polyisocyanates to form a pre-polymer solution having free or unreacted polyisocyanate therein. Reaction is generally carried out at temperatures of from about 80° C. to about 220° C. and preferably from about 150° C. to about 200° C. in the presence of a suitable urethane catalyst. Subsequently, a selective type of chain extender as noted above is added in an equivalent amount generally equal to the isocyanate end groups as well as to any free or unreacted diisocyanate compounds. The overall equivalent ratio of the total diisocyanate to the total equivalent of the hydroxyl terminated polyether and the chain extender is thus from about 0.95 to about 1.10, desirably from about 0.98 to about 1.05 and preferably from about 0.99 to about 1.03. The equivalent ratio of the hydroxyl terminated polyether to the chain extender is generally from about 0.5 to about 1.5 and desirably from about 0.7 to about 1. The chain extension reaction temperature is generally from about 1 80° C. to about 250° C. with from about 200° C. to about 240° C. being preferred. Typically, the pre-polymer route can be carried out in any conventional device with an extruder being preferred. Thus, the polyether intermediate is reacted with an equivalent excess of a diisocyanate in a first portion of the extruder to form a pre-polymer solution and subsequently the chain extender is added at a downstream portion and reacted with the pre-polymer solution. Any conventional extruder can be utilized, with extruders equipped with barrier screws having a length to diameter ratio of at least 20 and preferably at least 25.

Useful additives can be utilized in suitable amounts and include opacifying pigments, colorants, mineral fillers, stabilizers, lubricants, UV absorbers, processing aids, and other additives as desired. Useful opacifying pigments include titanium dioxide, zinc oxide, and titanate yellow, while useful tinting pigments include carbon black, yellow oxides, brown oxides, raw and burnt sienna or umber, chromium oxide green, cadmium pigments, chromium pigments, and other mixed metal oxide and organic pigments. Useful fillers include diatomaceous earth (superfloss) clay, silica, talc, mica, wallostonite, barium sulfate, and calcium carbonate. If desired, useful stabilizers such as antioxidants can be used and include phenolic antioxidants, while useful photostabilizers include organic phosphates, and organotin thiolates (mercaptides). Useful lubricants include metal stearates, paraffin oils and amide waxes. Useful UV absorbers include 2-(2'-hydroxyphenol) benzotriazoles and 2-hydroxybenzophenones.

Plasticizer additives can also be utilized advantageously to reduce hardness without affecting properties.

During the melt spinning process, the TPU polymer described above is lightly crosslinked with a crosslinking agent. The crosslinking agent is a pre-polymer of a hydroxyl terminated intermediate that is a polyester, polycarbonate, polycaprolactone, or mixture thereof reacted with a polyisocyanate. A polyester is the preferred hydroxyl terminated intermediate to make the crosslinking agent. Polyether hydroxyl terminated intermediates should be avoided as they hinder the melt spinning process. The crosslinking agent, pre-polymer, will have an isocyanate functionality of greater than about 1.0, preferably from about 1.0 to about 3.0, and more preferably from about 1.8 to about 2.2. It is particularly preferred if both ends of hydroxyl terminated intermediate is capped with an isocyanate, thus having an isocyanate functionality of 2.0.

The polyisocyanate used to make the crosslinking agent are the same as described above in making the TPU polymer. A diisocyanate, such as MDI, is the preferred diisocyanate.

The hydroxyl terminated polyester intermediate is generally a linear or branched polyester having a number average molecular weight (Mn) of from about 500 to about 10,000, desirably from about 700 to about 5,000, and preferably from about 700 to about 4,000, and more preferably from about 2,000 to about 3,000, an acid number generally less than 1.3 and preferably less than 0.8. The molecular weight is determined by assay of the terminal functional groups and is related to the number average molecular weight. The polymers are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from c-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be straight chain or branched aliphatic, aromatic, or combinations thereof, and have a total of from 2 to 12 carbon atoms, and include ethylene glycol, diethylene glycol, triethylene glycol, 1,2-propanediol, 1,3-propanediol, 1,3-butanediol, 1,4-butanediol, 1,5-pentanediol, 2-methyl-2,4 pentanediol, 1,6-hexanediol, 2,2-dimethyl-1,3-propanediol (neopentyl glycol), 1,4-cyclohexanedimethanol, decamethylene glycol, dodecamethylene glycol, and mixtures thereof. 1,4-butanediol, neopentyl glycol, ethylene glycol and mixtures thereof are the preferred glycols. A particular desirable polyester crosslinking agent is one made using a mixture of a branched glycol, such as neopentyl glycol, with a straight chain glycol, such as 1,4-butanediol with the glycol mixture reacted with adipic acid and end capped with MDI to form a pre-polymer that is used as the crosslinking agent.

The polycarbonate-based crosslinking agent (pre-polymer) of this invention is prepared by reacting a diisocyanate with a blend of a hydroxyl terminated polycarbonate and a chain extender. The hydroxyl terminated polycarbonate can be prepared by reacting a glycol with a carbonate.

U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecular with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6, 2,2,4-trimethylhexanediol-1,6, decanediol-1,10, hydrogenated dilinoleylglycol, hydrogenated dioleylglycol; and cycloaliphatic diols such as cyclohexanediol-1,3, dimethylolcyclohexane-1,4, cyclohexanediol-1,4, dimethylolcyclohexane-1,3, 1,4-endomethylene-2-hydroxy-5-hydroxymethyl cyclohexane, and polyalkylene glycols. The diols used in the reaction may be a single diol or a mixture of diols depending on the properties desired in the finished product.

Polycarbonate intermediates which are hydroxyl terminated are generally those known to the art and in the literature. Suitable carbonates are selected from alkylene carbonates composed of a 5 to 7 membered ring having the following general formula:

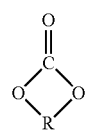

where R is a saturated divalent radical containing 2 to 6 linear carbon atoms. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate, and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm of mercury in the presence or absence of an ester interchange catalyst, while removing low boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100° C. to 300° C., preferably at 1 50° C. to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 1 00° C. to 300° C., preferably 150° C. to 250° C. and at a pressure of 0.1 to 10 mm Hg until the desired molecular weight of the hydroxyl terminated polycarbonate is attained. Molecular weight (Mn) of the hydroxyl terminated polycarbonates can vary from about 500 to about 10,000 but in a preferred embodiment, it will be in the range of 500 to 2500.

The crosslinking agents have a number average molecular weight (Mn) of from about 1,000 to about 10,000, preferably from about 1,500 to about 4,000 and more preferably from about 1,800 to about 2,800.

The weight percent of crosslinking agent used with the TPU polymer is from about 5.0% to about 20%, preferably about 8.0% to about 17%, and more preferably from about 10% to about 17%. The percentage of crosslinking agent used is weight percent based upon the total weight of TPU polymer and crosslinking agent.

The melt spinning process to make TPU fibers involves feeding a preformed TPU polymer, usually which is melted in the extruder and the crosslinking agent is added continuously downstream near the point where the TPU melt exits the extruder or after the TPU melt exits the extruder. The crosslinking agent can be added to the extruder before the melt exits the extruder or after the melt exits the extruder. If added after the melt exits the extruder, the crosslinking agent needs to be mixed with the TPU melt using static or dynamic mixers to assure proper mixing of the crosslinking agent into the TPU polymer melt. After exiting the extruder, the melted TPU polymer with crosslinking agent flows into a manifold. The manifold divides the melt stream into different streams, where each stream is fed to a plurality of spinnerets. Usually, there is a melt pump for each different stream flowing from the manifold, with each melt pump feeding several spinnerets. The spinneret will have a small hole through which the melt is forced and exits the spinneret in the form of a fiber. The size of the hole in the spinneret will depend on the desired size (denier) of the fiber. The fiber is drawn or stretched as it leaves the spinneret and is cooled before winding onto bobbins. The fibers are stretched by winding the bobbins at a higher speed than that of fiber exiting the spinneret. For the melt spun TPU fibers, the bobbins are usually wound at a rate of 4 to 6 times the speed of the fiber exiting the spinneret, but can be wound slower or faster depending on the particular equipment. Typical bobbin winding speeds can vary from 100 to 3000 meters per minute, but more typical speeds are 300 to 1200 meters per minute for TPU melt spun fibers. Finish oils, such as silicone oils, are usually added to the surface of the fibers after cooling and just prior to being wound into bobbins.

An important aspect of making melt spun TPU fibers is the time one can run the process continuously without stopping. The necessity to stop the process is usually a result of fiber breaking. Fiber breaking occurs when the pressure at the spinneret increases to an unacceptable level. When the pressure reaches about 140 to 200 Kg force per square cm., fiber breakage will usually occur. Pressure buildup can occur for several reasons such as improper mixing leading to formation of products due to self reaction of the crosslinking agent causing partial blockage of the small exit hole in the spinneret for the fiber. The present invention allows for much longer run times before exceeding harmful pressure resulting in fiber breakage.

Melt spun TPU fibers can be made in a variety of denier. Denier is a term in the art designating the fiber size. Denier is the weight in grams of 9000 meters of fiber length. Typical melt spun TPU fibers are made in a denier size of 240 or less, more typical from 20 to 240 denier size, with 20 denier being a popular size.

The elastic TPU fibers are used to combine by knitting or weaving with other fibers such as natural and synthetic fibers to make various articles of clothing. The TPU fibers can be dyed various colors.

The invention will be better understood by reference to the following examples.

EXAMPLES

Example 1 shows the making of a polyether TPU polymer using PTMEG as the hydroxyl terminated polyether polyol, MDI as the polyisocyanate, and 1,4-butanediol as the chain extender. The one shot process described above was used to make the TPU of Example 1. The TPU polymer from Example 1 was used in Examples 2-6 for the melt spinning trials. Example 2 is a comparative example using a polyether crosslinking agent while Examples 3-6 uses a polyester crosslinking agent according to this invention.

Example 1

Polyether polyol PTMEG of molecular weight 2000 Daltons is charged into a heated (90° C.) and agitated tank blended with based on 100 parts by weight of the final polymer weight, with 0.3 parts by weight antioxidant and 0.3 parts by weight UV stabilizer. A second preheated tank was charged with the chain extender, 1,4-butanediol, and kept at 50° C. A third preheated agitated tank contained 4,4'-methylenebisphenylisocyanate (MDI). The ingredients of the three tanks were metered accurately into the throat of a 40 mm co-rotating twin-screw extruder reactor made by Werner & Pfleiderer Corp., Ramsay, N.J. The extruder had 11 barrel sections which were heated between 190° C. to 205° C. The end of the extruder was coupled to an underwater pelletizer after a six hole die equipped with screen packs. The following formulation was run continuously by metering 25.07 parts by weight of MDI, 5.82 parts by weight of 1,-4-butanediol and 68.5 parts by weight of polyol (PTMEG). Extruder throughput was adjusted to 150 lbs/hr while from a separate small tank 50 ppm (based on polymer) of stannous octoate catalyst was injected into the polyol stream. The polyether TPU product was underwater pelletized and collected in a heated silo at 105° C. to dry the product for three hours. The polyether TPU product produced in this way was used in Examples 2-6 to make melt spun TPU fibers. The TPU polymer had a Mw of 300,000 Daltons.

Example 2 (Comparative)

The TPU polymer of Example 1 was pre-dried in a vacuum batch dryer at 80° C. for 12 hours. After drying the TPU polymer was melted in a 1.25 inch single screw extruder with an L/D ratio of 24. The back pressure at the extruder outlet was kept constant with a loop control. The extruder had four heating zones that were maintained between 180° C. and 219° C. On exiting the extruder, the TPU polymer melt was mixed with 13.1% by weight of a polyether pre-polymer crosslinking agent (Hyperlast 5196) having a number average molecular weight of 1500. The crosslinking agent was pumped at a constant flow rate from a holding tank. The crosslinking agent was mixed with the TPU polymer melt in a dynamic mixer and then pumped through a manifold to 32 spinnerets. Each spinneret had an orifice size of 0.5 mm. The polymer stream exiting the spinneret was cooled by air and the fiber formed was wound into a bobbin at a winding speed of 480 meters per minute. The fiber on the bobbins were heat aged at 80° C. for 24 hours before testing.

The fiber produced was 20 denier in size. The pressure at the spinneret was measured during the run. FIG. 1 shows a graph of the pressure buildup during the run. The data shows that the spin pack pressure force at the start of the run was about 30 Kg/cm². After 21 hours of continuously running the pressure had increased to about 45 Kg/cm² and thereafter proceeded to rise rapidly reaching 100 Kg/cm² after 31 hours. After 50 hours, the spin pack pressure reached 180 Kg/cm² and several of the fibers started to break. The run was stopped after 50 hours because of fiber breakage.

Example 3

This Example is presented to show that the polyester crosslinking agent gives much less spin pack pressure buildup than the polyether crosslinking agent used in Example 2.

The TPU polymer, the melt spinning equipment and conditions were as described above in Example 2. The only difference was the crosslinking agent used. In this Example, 14.0 weight percent of a polyester crosslinking agent was used. The polyester crosslinking agent used was Diprane® 5128 from Hyperlast Company which has a number average molecular weight of 2500.

The fiber produced was 20 denier and at the same speed as in Example 1 (480 meters per minute).

The spin pack pressure force was measured during the run. FIG. 1 shows a graph of the pressure buildup during the run. The data show the spin pack pressure force at the start of the run was about 15 Kg/cm². After about 8 hours, the spin pack pressure increased to 20 Kg/cm². The run was continued for a total of 110 hours and the spin pack pressure remained at 20 Kg/cm². There was no fiber breakage and the run was stopped after 110 hours because the starting material was all consumed.

In comparing Examples 2 and 3, it can be seen that the difference in melt spinability is quite surprising when using a polyester crosslinking agent versus a polyether crosslinking agent with the same base TPU polymer. The polyether crosslinking agent (Example 2) could only be run continuously for about 50 hours before getting fiber breakage, whereas the polyester crosslinking agent ran for 110 hours with no fiber breakage and a pressure buildup of only 20 Kg/cm². It is believed that since the polyester crosslinking agent (Example 3) did not buildup any increased pressure for the last 100 hours, it could likely have run for a much longer time, if there had been sufficient material available to continue the run.

The 20 denier TPU melt spun fibers produced by Example 3 were tested for their elastic properties. Fiber tensile properties were measured using Table Top Model 5564 Instron equipped with tension/compression load cell (10 N maximum static load capacity) and pneumatic yarn grips to prevent fiber slippage and "at grip" breaks.

The test procedure employed was that developed by DuPont for elastic yarns used in garments requiring either good recovery from stretch or good holding power. This test subjects fibers to a series of 5 cycles. In each cycle, the fiber is alternately stretched to 300% elongation, and relaxed using a constant extension rate (between the original gage length and 300% elongation). The % set is measured after completion of the $5^{th}$ cycle. Then, the fiber specimen is taken through a $6^{th}$ cycle and stretched to breaking. The instrument records the load at each extension, the highest load before breaking, and the breaking load in units of grams force per denier as well as the breaking elongation and elongation at the maximum load.

The test conditions were at 23° C.±2° C; 50%±5% humidity. Fiber length of the test specimens were 50.0 mm and the linear density was 20.60 denier. Four specimens were tested. The results are shown in Table I.

TABLE I

| | |
|---|---|
| $1^{st}$ Load Pull @ 100% | 0.170 g/denier |
| $1^{st}$ Load Pull @ 150% | 0.218 g/denier |
| $1^{st}$ Load Pull @ 200% | 0.273 g/denier |
| $1^{st}$ Load Pull @ 300% | 0.432 g/denier |
| $1^{st}$ Unload Pull @ 200% | 0.029 g/denier |
| $1^{st}$ Unload Pull @ 150% | 0.020 g/denier |
| $1^{st}$ Unload Pull @ 100% | 0.017 g/denier |
| % Set After $1^{st}$ Pull | 20.12% |
| $5^{th}$ Load Pull @ 100% | 0.024 g/denier |
| $5^{th}$ Load Pull @ 150% | 0.033 g/denier |
| $5^{th}$ Load Pull @ 200% | 0.047 g/denier |

TABLE I-continued

| | |
|---|---|
| 5th Load Pull @ 300% | 0.238 g/denier |
| 5th Unload Pull @ 200% | 0.026 g/denier |
| 5th Unload Pull @ 150% | 0.019 g/denier |
| 5th Unload Pull @ 100% | 0.016 g/denier |
| % Set After 5th Pull | 26.536% |
| 6th Load Pull Break Load | 1.139 g/denier |
| 6th Load Pull Break Elongation | 673.08% |

All of the above data are a mean value for 4 specimens tested.

From the above data, it can be seen that the melt spun fibers have excellent elastic properties.

Example 4

This Example is presented to show that a polyester crosslinker of neopentyl glycol adipate, which has a branched glycol component (neopentyl glycol), gives long melt spinning run times with no fiber breakage.

The TPU polymer of Example 1 was used and melt spun fibers (20 denier) were made on a melt spinning fiber pilot line smaller than that used in Examples 2 and 3. The polyester crosslinking agent used was Diprane 5253 (Hyperlast Company) which is a neopentyl glycol adipate intermediate reacted with MDI to form a pre-polymer having a number average molecular weight (Mn) of 2500. During the melt spinning, 14.0 weight percent of the polyester crosslinking agent was added to the TPU polymer.

Melt spinning was conducted for 100 hours with no fiber breakage. The run was terminated due to lack of further material.

Example 5

This Example is presented to show that a polyester crosslinker using a 50/50 mole percent of a combination of a branched glycol (neopentyl glycol) with a straight chain glycol (1,4-butadiene diol) reacted with adipic acid, gives long melt spinning run time with no fiber breakage.

The TPU polymer of Example 1 was used and melt spun fibers (20 denier) were made on the same melt spinning fiber pilot line as in Example 4. The polyester crosslinking agent used was adipic acid reacted with a 50/50 mole percent of neopentyl glycol and 1,4-butanediol and reacted with MDI to form a pre-polymer having a number average molecular weight (Mn) of 2500. During the melt spinning, 14.0 weight percent of the polyester crosslinking agent was added to the TPU polymer.

Melt spinning was conducted for 100 hours with no fiber breakage. The run was terminated due to lack of further material.

Example 6

This Example is presented to show that a polyester crosslinker using a 50/50 mole percent of a combination of a branched glycol (neopentyl glycol) with a straight chain glycol (1,6-hexanediol) reacted with adipic acid, gives long melt spinning run time with no further breakage.

The TPU polymer of Example 1 was used and melt spun fibers (20 denier) were made on the same melt spinning fiber pilot line as in Examples 4 and 5. The polyester crosslinking agent used was adipic acid reacted with a 50/50 mole percent of neopentyl glycol and 1,6-hexanediol and reacted with MDI to form a pre-polymer having a number average molecular weight (Mn) of 2500. During the melt spinning, 14.0 weight percent of the polyester crosslinking agent was added to the TPU polymer.

Melt spinning was conducted for 100 hours with no fiber breakage. The run was terminated due to lack of further material.

While in accordance with the Patent Statutes, the best mode and preferred embodiment has been set forth, the scope of the invention is not limited thereto, but rather by the scope of the attached claims.

What is claimed is:

1. A thermoplastic polyurethane polymer comprising the reaction product of:
    (a) at least one hydroxyl terminated polyether intermediate having a number average molecular weight of at Least 1200 Daltons;
    (b) at least one diisocyanate; and
    (c) at least one hydroxyl terminated chain extender;
    wherein said polymer formed by reacting (a), (b), and (c) is crosslinked with at least one crosslinking agent made by reacting (i) a hydroxyl terminated polyester polyol; and (ii) at least one diisocyanate; wherein said hydroxyl terminated polyester polyol in (i) is made by reacting a dicarboxylic acid with a mixture of at least one branched glycol and at least one straight chain glycol; and wherein said polymer has a weight average molecular weight before adding said crosslinking agent of from about 150.000 to about 800,000 Daltons.

2. The thermoplastic polyurethane polymer of claim 1 wherein said diisocyanate is diphenyl methane-4,4' diisocyanate.

3. The thermoplastic polyurethane polymer of claim 1 wherein said hydroxyl terminated polyether intermediate has a number average molecular weight of from about 1500 to about 4000 Daltons.

4. The thermoplastic polyurethane polymer of claim 3 wherein said hydroxyl terminated polyether intermediate has a number average molecular weight of from about 1800 to about 2500 Daltons.

5. The thermoplastic polyurethane polymer of claim 4 wherein said hydroxyl terminated polyether intermediate is polytetramethylene ether glycol.

6. The thermoplastic polyurethane polymer of claim 1, wherein said dicarboxylic acid is adipic acid.

7. The thermoplastic polyurethane polymer of claim 1, wherein said branched glycol is neopentyl glycol.

8. The thermoplastic polyurethane polymer of claim 1, wherein said straight chain glycol is selected from the group consisting of 1,4-butanediol and 1,6-hexanediol.

9. The thermoplastic polyurethane polymer of claim 1, wherein said glycol is a 50/50 mole percent mixture of neopentyl glycol and 1,4-butanediol.

10. The thermoplastic polyurethane polymer of claim 1 wherein said polymer has a weight average molecular weight before adding said crosslinking agent of from about 200,000 to about 400,000 Daltons.

11. The thermoplastic polyurethane polymer of claim 10 wherein said weight average molecular weight is from about 250,000 to about 350,000 Daltons.

12. The thermoplastic polyurethane polymer of claim 1 wherein said crosslinking agent has a number average molecular weight of from about 1,000 to about 10,000 Daltons.

13. The thermoplastic polyurethane polymer of claim 12 wherein said crosslinking agent has a number average molecular weight of from about 1,500 to about 4,000 Daltons.

14. The thermoplastic polyurethane polymer of claim 13 wherein said crosslinking agent has a number average molecular weight of from about 1,800 to about 2,800 Daltons.

15. The thermoplastic polyurethane polymer of claim 1 wherein said hydroxyl terminated chain extender is 1,4-butanediol.

16. The thermoplastic polyurethane polymer of claim 14 wherein said crosslinking agent is used at a level of from about 5.0 to about 20.0 weight percent of the total weight of said polymer and said crosslinking agent.

17. The thermoplastic polyurethane polymer of claim 16 wherein the level of said crosslinking agent is from about 8.0 to about 17.0 weight percent.

18. The thermoplastic polyurethane polymer of claim 17 wherein the level of said crosslinking agent is from about 10.0 to about 17.0 weight percent.

19. The thermoplastic polyurethane polymer of claim 1 in the form of a fiber.

20. The thermoplastic polyurethane polymer of claim 19, wherein said fiber has a size of from about 20 to about 240 denier.

21. A process for producing melt spun thermoplastic polyurethane fibers comprising:
  (a) melting a polyether thermoplastic polyurethane polymer having a weight average molecular weight of from about 150,000 to about 800,000 Daltons in an extruder, said thermoplastic polyurethane polymer made by reacting (i) at least one hydroxyl terminated polyether intermediate having a number average molecular weight of at least 1200 Daltons, (ii) at least one diisocyanate, and (iii) at least one hydroxyl terminated chain extender;
  (b) adding to said melted thermoplastic polyurethane polymer at least one crosslinking agent made from reacting (i) a hydroxyl terminated polyester polyol, and (ii) at least one diisocyanate; wherein said hydroxyl terminated polyester polyol in (i) is made by reacting a dicarboxylic acid with a mixture of at least one branched glycol and at least one straight chain glycol;
  (c) feeding said melted thermoplastic polyurethane polymer mixed with said crosslinking agent to at least one spinneret;
  (d) passing said melted polymer containing said crosslinking agent through said spinneret to produce melt spun fibers;
  (e) cooling said fibers; and
  (f) winding said fibers onto bobbins.

22. The process of claim 21 wherein said crosslinking agent is added to said melted polyether thermoplastic polyurethane polymer in said extruder.

23. The process of claim 21 wherein said crosslinking agent is added to said melted polyether thermoplastic polyurethane polymer after said polymer exits said extruder.

24. The process of claim 23 wherein said crosslinking agent and said polymer are mixed with a dynamic mixer.

25. The process of claim 23 wherein said crosslinking agent and said polymer are mixed with a static mixer.

26. The process of claim 21 wherein said crosslinking agent has a number average molecular weight of from about 1,800 to about 2,800 Daltons.

27. The process of claim 21 wherein said dicarboxylic acid is adipic acid.

28. The process of claim 21 wherein said branched glycol is neopentyl glycol.

29. The process of claim 21 wherein said bobbins are wound at a speed of from about 100 to about 3000 meters per minutes.

30. The process of claim 29 wherein said bobbins are wound at a speed of from about 300 to about 1200 meters per minute.

31. The process of claim 21 wherein said fibers have a size of 240 denier or less.

32. The process of claim 31 wherein said fibers have a size of from 20 to 240 denier.

33. The process of claim 21 wherein said crosslinking agent is used at a level of from about 5.0 to about 20.0 weight percent of the total weight of said polyether thermoplastic polyurethane polymer and said crosslinking agent.

* * * * *